United States Patent

[11] 3,616,349

[72] Inventor Raymond E. Szupillo
Painted Post, N.Y.
[21] Appl. No. 748,676
[22] Filed July 30, 1968
[45] Patented Oct. 26, 1971
[73] Assignee Corning Glass Works
Corning, N.Y.

[54] METHOD FOR ETCHING CHROMIUM OXIDE FILMS
13 Claims, 3 Drawing Figs.

[52] U.S. Cl. .... 204/143, 204/144
[51] Int. Cl. .... B23p 1/00
[50] Field of Search .... 204/143, 144, 141

[56] References Cited

UNITED STATES PATENTS

Re. 25,711 1/1965 Gaiser .... 204/143
3,108,931 10/1963 Wendell, Jr. .... 204/143
3,265,598 8/1966 Rohrman .... 204/144

*Primary Examiner*—John H. Mack
*Assistant Examiner*—Neil A. Kaplan
*Attorneys*—Clarence R. Patty, Jr. and Walter S. Zebrowski

ABSTRACT: A method of etching using weaker acid etchant solutions than heretofore possible wherein interaction between the chloride ions in solution and the film is initiated by producing an electrical potential across a thin oxide layer on the film sufficient to allow the chloride ions to permeate therethrough. Because a weaker etchant can be used in the process, thinner and softer photoresistive protective coatings can also be used for obtaining decorative film patterns, microcircuit masks, and the like. Further, the rate at which etching proceeds can now be controlled over a wider range than heretofore possible, thus effecting the amount of undercutting of the acid-resistant mask by the etchant.

INVENTOR.
Raymond E. Szupillo
BY
Walter S. Zaborski
ATTORNEY

METHOD FOR ETCHING CHROMIUM OXIDE FILMS

BACKGROUND OF THE INVENTION

Methods for etching chromium and tin oxide films known in the prior art require the use of highly corrosive etching solutions. One such solution consists of one part of a mixture of 500 grams of sodium hydroxide per liter of water, and three parts of a mixture of 330 grams of potassium ferricyanide per liter of water. A chromium film coated workpiece to be etched in a particular pattern with such a solution is first coated with a suitable light-sensitive acid barrier material such as Kodak Thin Film Resist, or the like. Thereafter an opaque mask is placed over the light-sensitive material to permit exposure of selected portions thereof to light. Following exposure, the mask is removed and the workpiece is immersed in a suitable developer solution to remove soluble portions of the material. The unsoluble portions remain adhered to the underlying film over areas which are to be protected from acid attack during the etching step which follows.

Unfortunately, because conventional etchants are so highly concentrated, it is necessary that the photoresistive coating be quite thick in order to restrain the etchant from dissolving portions of the coating and attacking the underlying film before etching of the exposed portions of the film has been completed. For this reason resistive coatings on the order of 8,000 A., in thickness are usually required. However, as will readily be appreciated by those skilled in the art, such thicknesses often result in poor pattern edge definition as well as poor line-pair resolution. For example, a line resolution of 200 line-pairs per millimeter is considered good resolution under such circumstances.

Moreover, to further insure insulation of the protected areas of the film from acid attack the photoresistive coating is baked on the workpiece in an oven to increase its hardness. Baking temperatures on the order of 200° C. are ordinarily required to produce sufficient hardness. However, such baking makes it difficult to remove the photoresistive coating following the etching operation and usually requires the use of strong solvents and heavy mechanical swabbing. In addition, where chromium films are concerned, the high temperatures at which the photoresistive coating is baked onto the film can produce a substantial increase in the incidence of pinholes and breakup in the film.

SUMMARY OF THE INVENTION

It is therefore an object of the instant invention to provide a method for etching chromium and tin oxide films using a weak acid etchant.

It is a further object of the instant invention to provide a method for etching chromium and tin oxide films having improved pattern edge definition and line resolution.

It is yet another object of the instant invention to provide a method for etching chromium and tin oxide films using thinner and softer photoresistive coatings for easier removal thereof than has heretofore been possible.

It is still another object of the instant invention to provide a method for etching chromium and tin oxide films wherein the etching rate can be controlled over a wider range than has heretofore been possible.

It is another object of the instant invention to provide a method for etching chromium films using relatively soft photoresistive coatings that do not require baking at high temperatures so as to avoid the high incidence of pinhole formation that could otherwise occur.

It is another object of the instant invention to provide an improved method for the etching of soft chromium and tin oxide films.

Briefly, in accordance with the instant invention, a workpiece containing a film consisting of chromium or tin oxide is provided. The film is masked to protect selected surface areas thereof from acid attack. The workpiece is thereafter immersed in an etching solution containing chloride ions. An electrical potential difference is applied across the film surface sufficient in magnitude to initiate interaction between the chloride ions and the film.

Additional objects, features, and advantages of the instant invention will become apparent to those skilled in the art from the following detailed description and attached drawings on which, by way of example, only the preferred embodiments of the instant invention are illustrated.

DETAILED DESCRIPTION OF THE PREFERRED EMBODIMENTS

Figure 1:
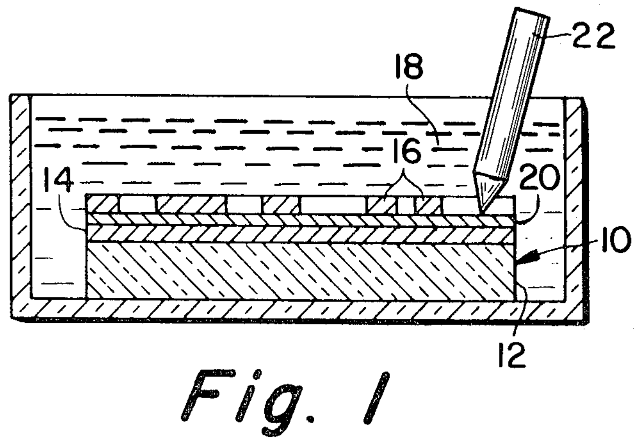
FIGS 1 through 3 are cross-sectional elevation views illustrating three separate embodiments of the instant invention.

Referring to the figures there is shown a workpiece 10 consisting of a substrate 12 such as glass, ceramic material, or the like, a thin coating of chromium film 14 applied to the substrate 12 by any well-known method, and a thin layer of acid-resistant barrier material 16 protecting selected areas of the film 14 from acid attack. The material 16 may be any well-known form of acid-resistant mask such as, for example, a thin layer of light-sensitive photoresistant substance, e.g., Kodak Photo Resist, a tradename product of the Eastman Kodak Company of Rochester, New York. A complete description of this resist, and method for using it is described in publication P–7 entitled "Kodak Photosensitive Resists for Industry," copyrighted 1962, by the Eastman Kodak Company of Rochester, New York. The workpiece 10 is immersed in a suitable chromium-etching solution 18, preferably one containing a weak concentration of chloride ions as later more fully described. As is well known to those skilled in the art, the chromium film 14 readily forms a thin surface oxide layer 20 when the film 14 is exposed to air during the normal process of handling the workpiece 10.

Because of the existence of the oxide layer 20 the film 14 is sufficiently insulated from the weak chloride ion concentration of the solution 18 to prevent the etching process to occur when the workpiece 10 is immersed therein. To initiate the etching action on exposed areas of the film 14 above which none of the barrier material 16 is present, it is necessary to initiate an electrochemical reaction which will permit the chloride ions to permeate the thin oxide layer 20 and interact with the chromium film 14. Referring specifically to FIG. 1 one manner of accomplishing this is shown wherein a metal probe 22 of aluminum or zinc is brought into momentary contact with an exposed portion of the oxide layer 20. In the alternative, the probe 22 may be composed of any metal of the electrochemical series which is capable of displacing chromium.

As contact between the probe 22 and the layer 20 is made, chemical activity between the probe 22 and the solution 18 occurs with sufficient intensity to produce an electrochemical cell potential between the layer 14 and the solution 18. This cell potential, in turn, permits the chloride ions of the solution 18 to permeate the layer 20 and attack the exposed areas of the film 14 resulting in etching of the latter. The rate at which etching occurs is dependent upon the chloride ion concentration of tie solution 18 which can be adjusted over a wide range in order to control the amount of undercutting of the barrier material 16 with a high degree of accuracy. It should be noted that once the etching action has been initiated the probe 22 may be withdrawn from the solution 18 as the probe 22 itself has no effect on the etching process beyond that of initiating it.

The advantage of using a hand-held probe is that the workpiece 10 may be placed in the solution 18 and permitted to remain there for an indefinite period without the etching process being initiated until desired. However, the etching process could just as well be initiated by attaching a simple aluminum or zinc clip, now shown, to the workpiece 10 so as to contact a portion of the oxide layer 20. Etching would thereby occur as soon as the workpiece 10 and attached clip, not shown, were immersed in the etchant.

Figure 2:
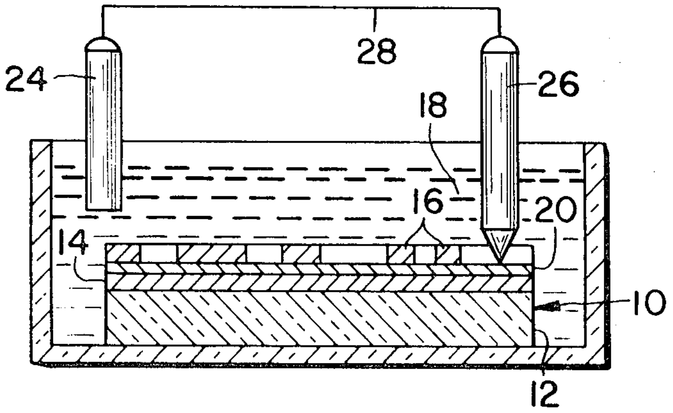

Another way in which the etching action can be initiated is illustrated in FIG. 2 in which an inert electrode 24 such as platinum is brought into contact with the solution 18. A second electrode 26 of the same type as the probe 22 previously described in relation to FIG. 1 is electrically connected to the electrode 24 by a conductive wire 28 external to the solution 18. The electrode 26 is brought into contact with the oxide layer 20 to form the required electrochemical cell and thereby initiate the etching process. As in the previous example, once etching activity has begun the electrodes 24 and 26 may be removed if desired.

Figure 3:
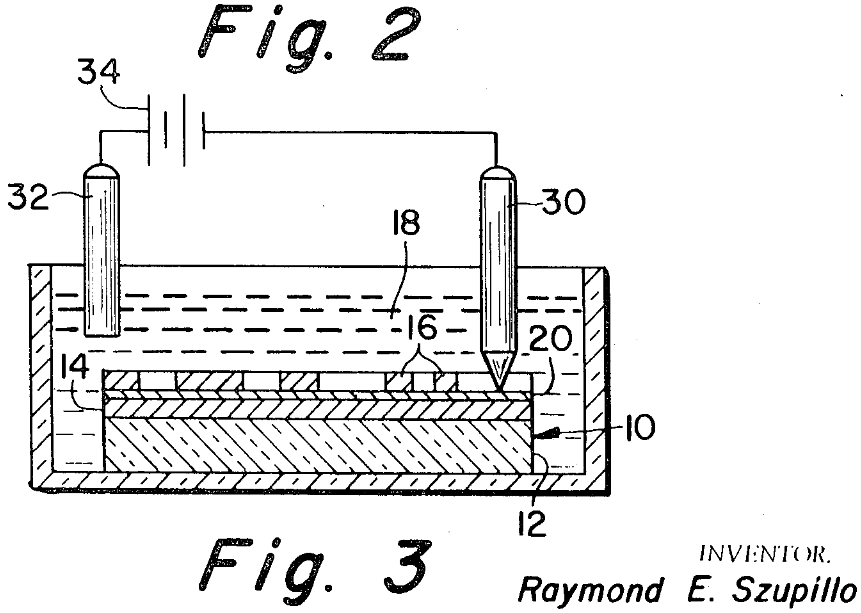

Referring to FIG 3 in another example of the instant invention two inert electrodes 30 and 32 such as, for example, platinum wires, are electrically connected to opposite poles of a source 34 of electrical potential. The electrode 32 is in contact with the solution 18 only. The electrode 30 is brought into physical contact with the oxide layer 20. An electrical potential as low as 1½ volts has been found to be sufficient to initiate etching action although lower potentials should be sufficient. In the latter case, however, it may be necessary to provide more than a momentary contact between the electrode 30 and the oxide layer 20 to initiate self-sustaining etching of the film 14. A potential of 9 volts has also been employed to cause etching action to occur upon momentary contact between the electrode 30 and the oxide layer 20. Electrical potentials of 9 volts and higher have also been found to be of sufficient magnitude to initiate etching activity when the electrode 30 is brought within close proximity to the layer 20 without the necessity of actual physical contact thereto. Accordingly, by the term physical contact is meant either touching of the oxide layer 20 by the electrode 30 or sufficiently close physical proximity therebetween to initiate etching of the former.

The solution 18 should be a chloride ion containing solution such as hydrochloric acid, ammonium chloride, or other such solution containing chloride ions and having at least a slightly acidic pH level. HCl concentrations as low as one part HCl, 37.4 percent reagent grade, in 400 parts of water have been used to produce etching of soft chromium films by this method. Using such a concentration of HCl as an etchant solution, an unhardened chromium film 1,200 A., in thickness was etched in about 10 minutes, i.e., a rate of about 2 A./second. A 37.4 percent HCl-to-water ratio of HCl-to-water has been used to produce a chromium etch rate of about 20 A./second, a rate which readily permits control of the process without producing rapid undercutting of the barrier material 16. Hard baked chromium films may also be etched by the instant method, though the etch rate for a given HCl concentration will be significantly less than when etching soft chromium films. Also, since hydrogen is liberated by the reaction between the HCl, chromium, and water, bubbles often form on the surface of the workpiece 10. Their removal may be desirable and, if so, can easily be accomplished by agitating the workpiece 10 and the solution 18 in any well-known manner such as by ultrasonic agitation. In some cases simply tapping the vessel containing the workpiece 10 and etchant 18 will be sufficient.

The etching method of the instant invention is also applicable to tin oxide films although unlike chromium, only a certain area about the point of contact between the probe 22 of FIG. 1 and the tin oxide will react with a weak etchant. High-conductivity tin oxide films doped with antimony of the type used in resistor films have been etched in localized areas of up to about ¼ inch in radius from the point of contact of the probe 22. Lower conductivity tin oxide films have exhibited more localized etching conditions down to 1/16 inch in radius from the point of probe contact. However, unlike the etching of chromium films, the weak acid etching of tin oxide is not a self-sustaining reaction. The application of a potential to the tin oxide must therefore be continuous throughout the etching step rather than merely momentary. In the case of tin oxide film etching by the method of the instant invention, it is therefore desirable to use a zinc or aluminum clip capable of maintaining continuous physical contact with the film for the length of time that etching is to proceed. However all of the previously described examples are applicable in the instant case. Though continuous contact must be maintained, the ability to control the rate of etching of tin oxide films by controlling the acid pH of the weak etchant solution is unaffected.

Although the instant invention has been described wit respect to specific details of certain embodiments thereof it is not intended that such details be limitations on the instant invention except insofar as set forth in the following claims.

I claim:

1. A method of etching a film of chromium deposited on a substrate comprising forming said chromium film on said substrate, forming a thin surface oxide layer on said chromium film, contacting said oxide layer with an etching solution selected from the group consisting of hydrochloric acid and ammonium chloride, and said etching solution having a chloride ion concentration so adjusted that the solution will not chemically react with oxide-covered chromium film in the absence of an electrical potential but will react with chromium metal at a predetermined rate, and applying an electrical potential across said oxide layer to initiate a self-sustaining chemical reaction between said chromium film and said etching solution.

2. The method of claim 1 wherein the step of applying an electrical potential comprises contacting an oxidized surface portion of said film with an electrode of material selected from the group consisting of those elements in the electrochemical series above chromium.

3. The method of claim 1 wherein the step of applying an electrical potential comprises contacting an oxidized surface of said film with an electrode of material selected from the group consisting of aluminum and zinc.

4. The method of claim 1 further comprising masking selected portions of said film against attack by said ions.

5. The method of claim 1 wherein the step of applying an electrical potential comprises contacting an oxidized surface portion of said film with a first electrode of inert material with respect to said solution, contacting said solution with a second electrode of inert material with respect to said solution, and applying an electrical potential difference between said first and second electrodes external to said solution.

6. The method of claim 1 wherein the step of contacting said oxide layer with an etching solution comprises immersing said oxide-coated film in said etching solution.

7. The method of claim 1 which further comprises the step of removing said electrical potential after initiation of said self-sustaining chemical reaction between said chromium film and said etching solution to permit said chemical reaction to continue without said electrical potential.

8. A method of producing a patterned article by etching a film of chromium deposited on a substrate, comprising the steps of forming said chromium film on said substrate, forming a thin surface oxide layer on said chromium film, applying a masking material to selected areas of said oxide layer, contacting the unmasked portions of said oxide layer with an acid etching solution having a chloride ion concentration so adjusted that the solution will not chemically react with the oxide-covered chromium film in the absence of an electrical potential but will react with chromium metal at a predetermined rate, and applying an electrical potential across said oxide layer to initiate a self-sustaining chemical reaction between said chromium film and said etching solution.

9. The method of claim 8 wherein the step of contacting said oxide layer with an etching solution comprises immersing said oxide-coated film in said etching solution.

10. The method of claim 9 wherein the step of applying an electrical potential comprises contacting said oxide layer with an electrode of material selected from the group consisting of those elements in the electrochemical series above chromium.

11. The method of claim 9 wherein the step of applying an electrical potential comprises contacting said oxide layer with a first electrode of inert material with respect to said solution, contacting said solution with a second electrode of inert material with respect to said solution, and applying an electrical potential difference between said first and second electrodes external to said solution.

12. The method of claim 12 which further comprises the step of removing said electrical potential after initiation of said self-sustaining chemical reaction between said chromium film and said etching solution to permit said chemical reaction to continue without said electrical potential.

13. A method of etching a film of chromium deposited on a substrate comprising forming said chromium film on said substrate, forming a thin surface oxide layer on said chromium film, contacting said oxide layer with an acid etching solution having a chloride ion concentration so adjusted that the solution will not chemically react with the oxide-covered chromium film but will react with chromium metal at a predetermined rate, and applying an electrical potential across said oxide layer to initiate a self-sustaining chemical reaction between said chromium film and said etching solution.

* * * * *

PO-1050
(5/69)

UNITED STATES PATENT OFFICE
CERTIFICATE OF CORRECTION

Patent No. 3,616,349 Dated October 26, 1971

Inventor(s) Raymond E. Szupillo

It is certified that error appears in the above-identified patent and that said Letters Patent are hereby corrected as shown below:

| PATENT | APPLICATION |
|---|---|
| Column 2, line 60, "tie" should be -- the --; line 72, "now" should be -- not --. | Page 5, line 25<br>Page 6, line 6 |
| Column 3, line 44, delete "HCl-to-water" (second occurrence) and insert therefor -- 1:9 --. | Page 7, line 22 |
| Column 4, line 7, "wit" should be -- with --. | Page 8, line 29 |
| Claim 12, line 1, change "12" to -- 9 --. | Claim 12, line 1 |

Signed and sealed this 2nd day of May 1972.

(SEAL)
Attest:

EDWARD M.FLETCHER,JR.
Attesting Officer

ROBERT GOTTSCHALK
Commissioner of Patents